United States Patent
Yokoyama

(10) Patent No.: US 11,178,231 B2
(45) Date of Patent: Nov. 16, 2021

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Toshiharu Yokoyama, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 6 days.

(21) Appl. No.: 16/386,340

(22) Filed: Apr. 17, 2019

(65) Prior Publication Data

US 2020/0137172 A1   Apr. 30, 2020

(30) Foreign Application Priority Data

Oct. 25, 2018  (JP) .............................. JP2018-200676

(51) Int. Cl.
 *H04L 29/06* (2006.01)
 *H04L 12/58* (2006.01)
 *H04L 29/08* (2006.01)

(52) U.S. Cl.
 CPC ........ *H04L 67/146* (2013.01); *H04L 63/0876* (2013.01); *H04L 67/06* (2013.01); *H04L 67/10* (2013.01); *H04L 67/34* (2013.01); *H04L 51/04* (2013.01)

(58) Field of Classification Search
 CPC ....... H04L 67/146; H04L 67/06; H04L 67/10; H04L 67/34; H04L 63/0876; H04L 51/04
 See application file for complete search history.

(56) References Cited

U.S. PATENT DOCUMENTS

| | | | |
|---|---|---|---|
| 7,013,325 B1* | 3/2006 | Vivian | G09B 5/00 434/322 |
| 9,344,433 B2 | 5/2016 | Adams et al. | |
| 9,591,346 B2* | 3/2017 | Hu | H04N 21/4788 |
| 9,716,720 B2 | 7/2017 | Adams et al. | |
| 9,864,939 B2* | 1/2018 | Naitoh | G06F 3/1288 |
| 2016/0261537 A1* | 9/2016 | Yang | H04L 67/22 |
| 2017/0054711 A1* | 2/2017 | Shen | G06F 21/45 |
| 2017/0249711 A1* | 8/2017 | Odegard | G06F 16/3349 |
| 2018/0123996 A1* | 5/2018 | Yang | H04L 12/1818 |

FOREIGN PATENT DOCUMENTS

JP   2017-528795 A   9/2017

* cited by examiner

*Primary Examiner* — Sm A Rahman
(74) *Attorney, Agent, or Firm* — Oliff PLC

(57) ABSTRACT

An information processing apparatus includes a storage controller and a display controller. The storage controller performs control when storing of data is accepted from an unregistered user yet to be registered in advance. The control is performed to store the accepted data in association with identification information that enables the unregistered user to be discriminated from a different unregistered user. The display controller performs control when the unregistered user performs access to the information processing apparatus. The control is performed to switch data to be displayed to the unregistered user performing the access. The data is switched by using the identification information.

14 Claims, 16 Drawing Sheets

FIG. 4

| ACCEPTANCE IDENTIFIER | FOLDER IDENTIFIER |
|---|---|
| acceptance1 | folder1 |

FIG. 5

| ACCEPTANCE IDENTIFIER | DESTINATION IDENTIFIER | DESTINATION E-MAIL ADDRESS | URL |
|---|---|---|---|
| acceptance1 | address1 | taro@example.com | https://example.com/abcdefgh |
| acceptance1 | address2 | hanako@example.com | https://example.com/ijklmnop |

FIG. 6

| ACCEPTANCE IDENTIFIER | DOCUMENT FILE IDENTIFIER | DESTINATION IDENTIFIER |
|---|---|---|
| acceptance1 | document1 | address1 |
| acceptance1 | document2 | address2 |

FIG. 7

| FOLDER IDENTIFIER | DOCUMENT FILE IDENTIFIER |
|---|---|
| folder1 | document1 |
| folder1 | document2 |

FIG. 9

| Received | | | |
|---|---|---|---|
| Subject | Sender | Received date and time | |
| Receiving questionnaire answer | ○○○ | 1/1/2018 05:18 | |
| ....... | ..... | 12/31/2017 19:15 | |
| ....... | ..... | 12/15/2017 15:48 | |

Dear Mr. B,

Please access URL below and upload questionnaire answer.

https://example.com/abcdefgh

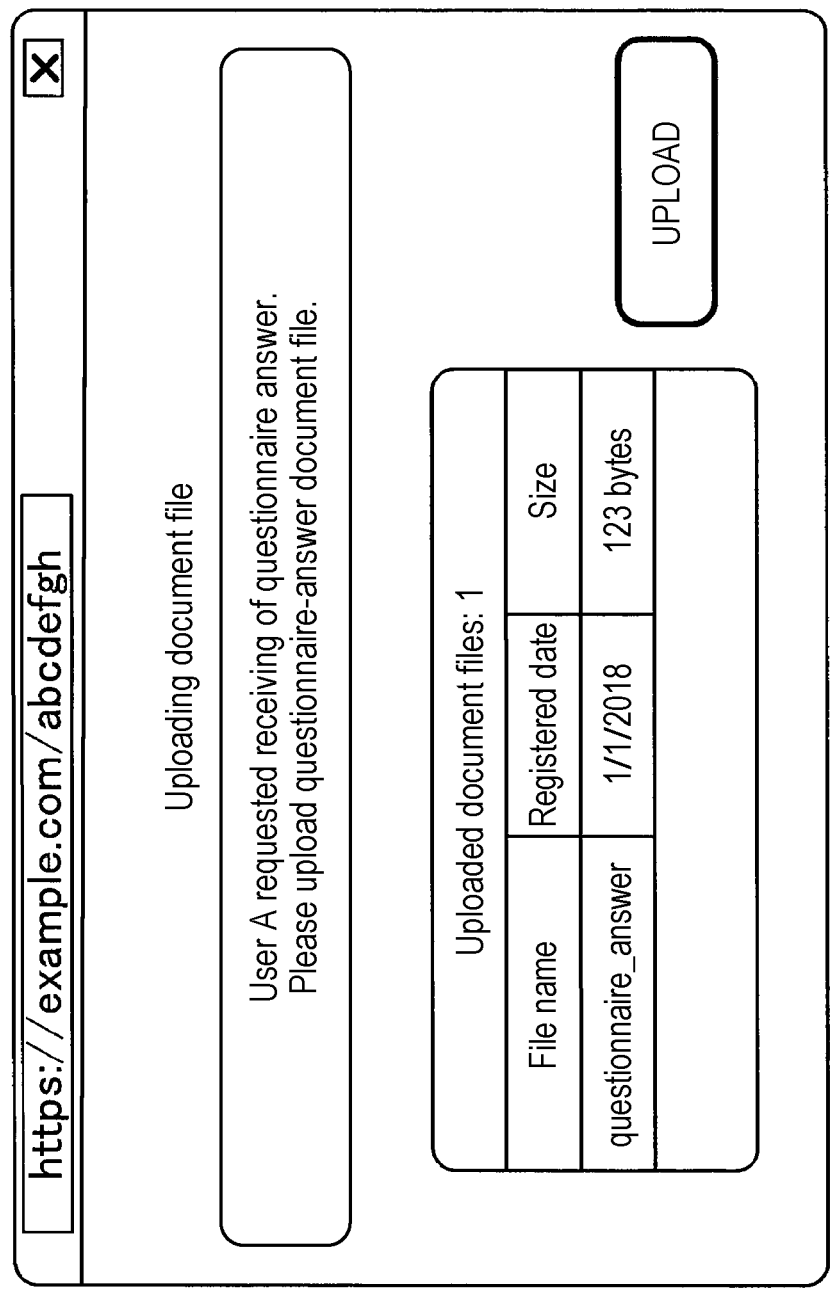

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-200676 filed Oct. 25, 2018.

BACKGROUND

(i) Technical Field

The present disclosure relates to an information processing apparatus and a non-transitory computer readable medium.

(ii) Related Art

Japanese Unexamined Patent Application Publication (Translation of PCT Application) No. 2017-528795 discloses a system in which users do not have to register or provide login credential information, that generates accounts of unregistered users by using unique identifiers associated with their respective computing devices, and that thereby enables the unregistered users to share a content item.

SUMMARY

Aspects of non-limiting embodiments of the present disclosure relate to an information processing apparatus and a non-transitory computer readable medium that enable each of unregistered users yet to be registered in advance to be prevented from reading data items stored by the other unregistered users when data items are accepted from the unregistered users and stored in the same storage area.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a storage controller and a display controller. The storage controller performs control when storing of data is accepted from an unregistered user yet to be registered in advance. The control is performed to store the accepted data in association with identification information that enables the unregistered user to be discriminated from a different unregistered user. The display controller performs control when the unregistered user performs access to the information processing apparatus. The control is performed to switch data to be displayed to the unregistered user performing the access. The data is switched by using the identification information.

BRIEF DESCRIPTION OF THE DRAWINGS

An exemplary embodiment of the present disclosure will be described in detail based on the following figures, wherein:

FIG. 4 is a table illustrating an example storage management table;

FIG. 5 is a table illustrating an example unregistered-user management table;

FIG. 6 is a table illustrating an example associated-identification-information management table;

FIG. 7 is a table illustrating an example stored-document-file management table;

FIG. 9 is a view illustrating an example e-mail transmitted to an unregistered user as the request for uploading a questionnaire answer;

FIGS. 12A and 12B are views respectively illustrating example upload screens displayed on the terminal apparatuses of the respective unregistered users;

DETAILED DESCRIPTION

An exemplary embodiment of the present disclosure will be described in detail with reference to the drawings.

Figure 1:
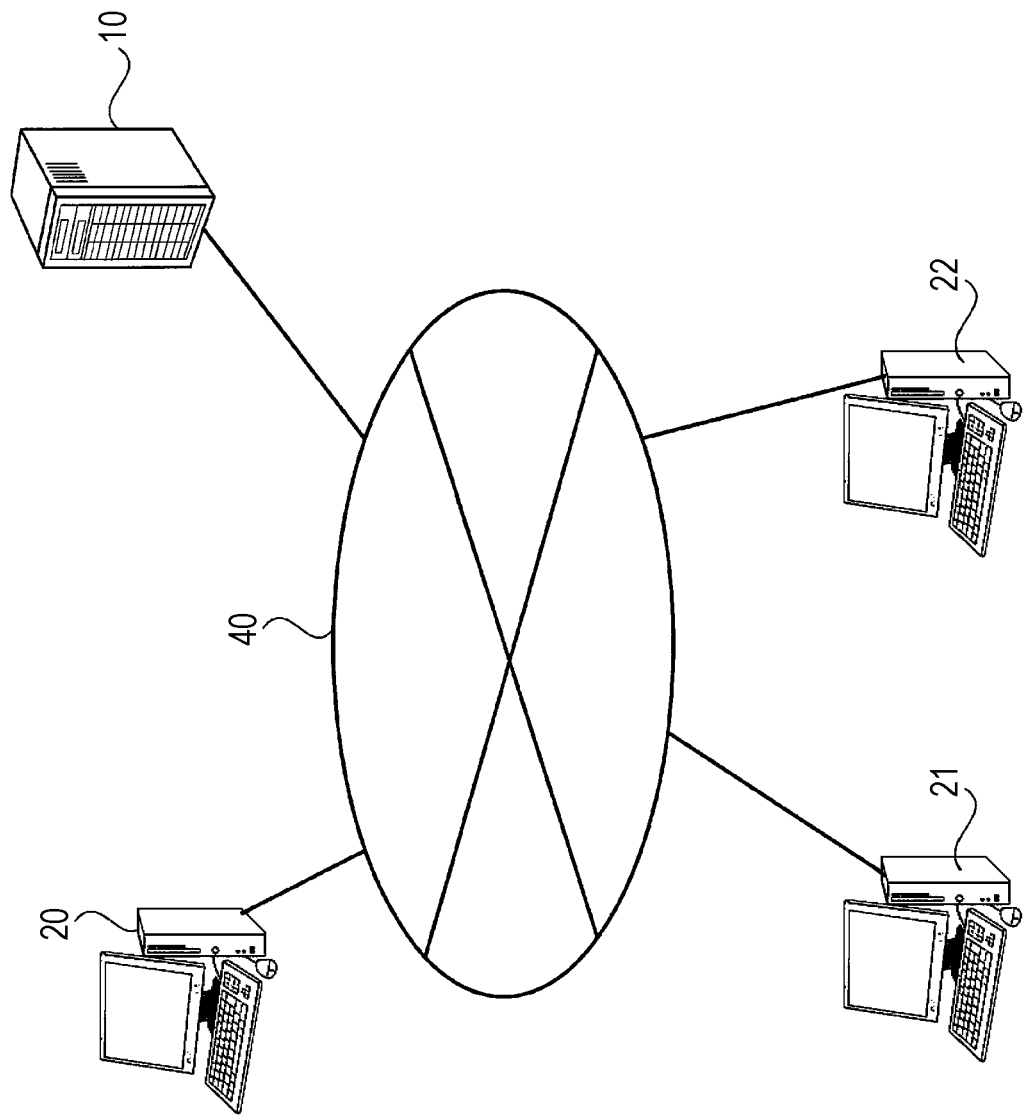
FIG. 1 is a diagram illustrating the system configuration of a document management system according to the exemplary embodiment of the present disclosure.

FIG. 1 is a diagram illustrating the system configuration of a document management system according to the exemplary embodiment of the present disclosure.

The document management system according to the exemplary embodiment of the present disclosure includes a document management server 10 and terminal apparatuses 20, 21, and 22 that are mutually connected via a network 40, as illustrated in FIG. 1.

In the document management system in this exemplary embodiment, the document management server 10 manages document files. The document management server 10 issues authentication information in advance such as login IDs and passwords to users who use the system, and each user is allowed to perform reading and the like of a stored document file after authentication steps are performed in accordance with the issued authentication information.

Hereinafter, the users to whom the authentication information are issued in advance are each referred to as a registered user, and users to whom the authentication information are not issued in advance are each referred to as an unregistered user. Since each registered user performs authentication steps using the authentication information when accessing the document management server 10, the document management server 10 may identify the user who has performed the access. Accordingly, if a user performing the access is a registered user, the reading of a document file may be managed in accordance with their access right.

However, there is a case where a user registered in the system as described above wishes to distribute a document file to unregistered users yet to be registered in the system. In such a case, the following configuration may be employed. Specifically, the document management server 10 transmits e-mails respectively including uniform resource locators (URLs) to the unregistered users, and each unregistered user may download a stored document file by accessing the document management server 10 by using the URL.

If e-mails respectively including different URLs are transmitted to the respective unregistered users even in a case where a document file is distributed to the multiple unregistered users, each unregistered user may be identified on the basis of the URL used when the unregistered user performs the access.

Further, in addition to the case where the document file is distributed to the multiple unregistered users, there is also a case where a document file is desired to be received from the multiple unregistered users. For example, such a situation applies a case where a questionnaire is distributed to a large number of unregistered users and document files of filled out questionnaires are desired to be received.

In the case as described above, if an unregistered user may read a questionnaire answer stored by a different unregistered user, trouble occurs. For example, if the unregistered users respectively store document files such as the questionnaire answers in different storage areas, it is possible to prevent each unregistered user from reading the questionnaire answers of the other unregistered users.

However, storing the questionnaire answers of the respective unregistered users in the respective different storage areas prevents the registered user from collectively reading the multiple questionnaire answers, and thus it is inconvenient. In addition, when the questionnaire answers are desired to be received from the large number of unregistered users, the storage areas the number of which is equal to the number of the unregistered users needed to be prepared, and thus it is not practical.

Hence, the document management server 10 in this exemplary embodiment is configured to prevent, by using the following method, each of unregistered users yet to be registered in advance from reading document files stored by the other unregistered users even when data items are accepted from the unregistered users and stored in the same storage area.

The terminal apparatus 20 in this exemplary embodiment is operated by a registered user A, and the terminal apparatuses 21 and 22 are respectively operated by unregistered users B and C. The case where there are only the registered user A as the registered user and only the unregistered users B and C as the unregistered users is described for simple explanation in this exemplary embodiment; however, a case where there are a large number of registered users and unregistered users is also applicable to the present disclosure.

Note that the case where the document files accepted from the unregistered users are the questionnaire answers is described in this exemplary embodiment; however, the present disclosure is not limited to this case and is likewise applicable to a case where document files other than the questionnaire answers or various data items other than the document files are accepted.

Figure 2:
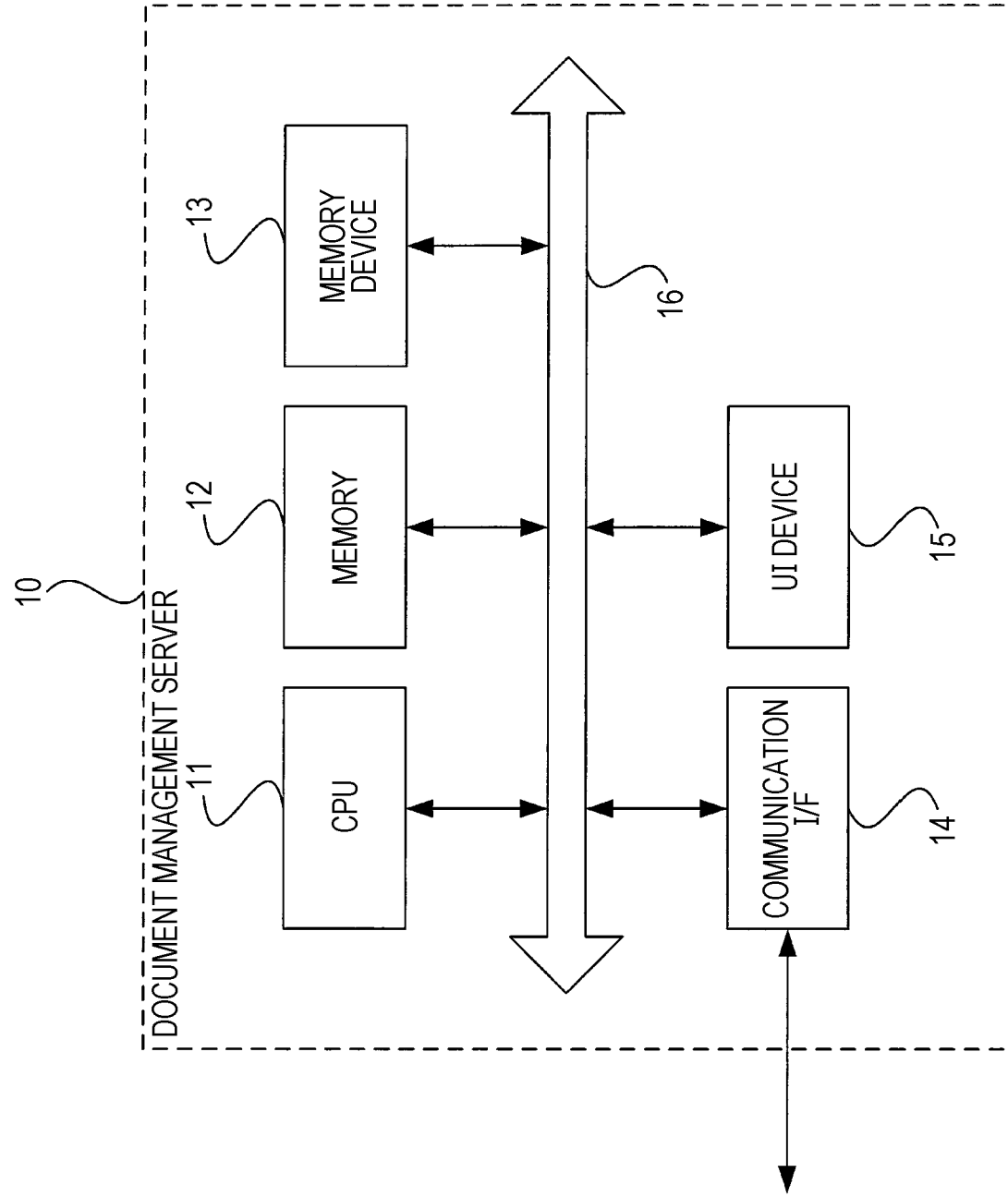
FIG. 2 is a block diagram illustrating the hardware configuration of a document management server in the exemplary embodiment of the present disclosure.

FIG. 2 illustrates the hardware configuration of the document management server 10 in the document management system in this exemplary embodiment.

As illustrated in FIG. 2, the document management server 10 includes a CPU 11, a memory 12, a memory device 13 such as a hard disk drive (HDD), a communication interface (I/F) 14 that transmits and receives data to and from an external apparatus and other apparatuses via the network 40, and a user interface (UI) device 15 including either a touch panel or the liquid crystal display and a keyboard. These components are connected to each other via a control bus 16.

The CPU 11 executes a predetermined process in accordance with a control program stored in the memory 12 or the memory device 13 and thereby controls the operation of the document management server 10. Although the CPU 11 reads out and runs the control program stored in the memory 12 or the memory device 13 in the description in this exemplary embodiment, the program may be provided to the CPU 11 in such a manner as to be stored in a storage medium such as a compact disc read only memory (CD-ROM).

Figure 3:
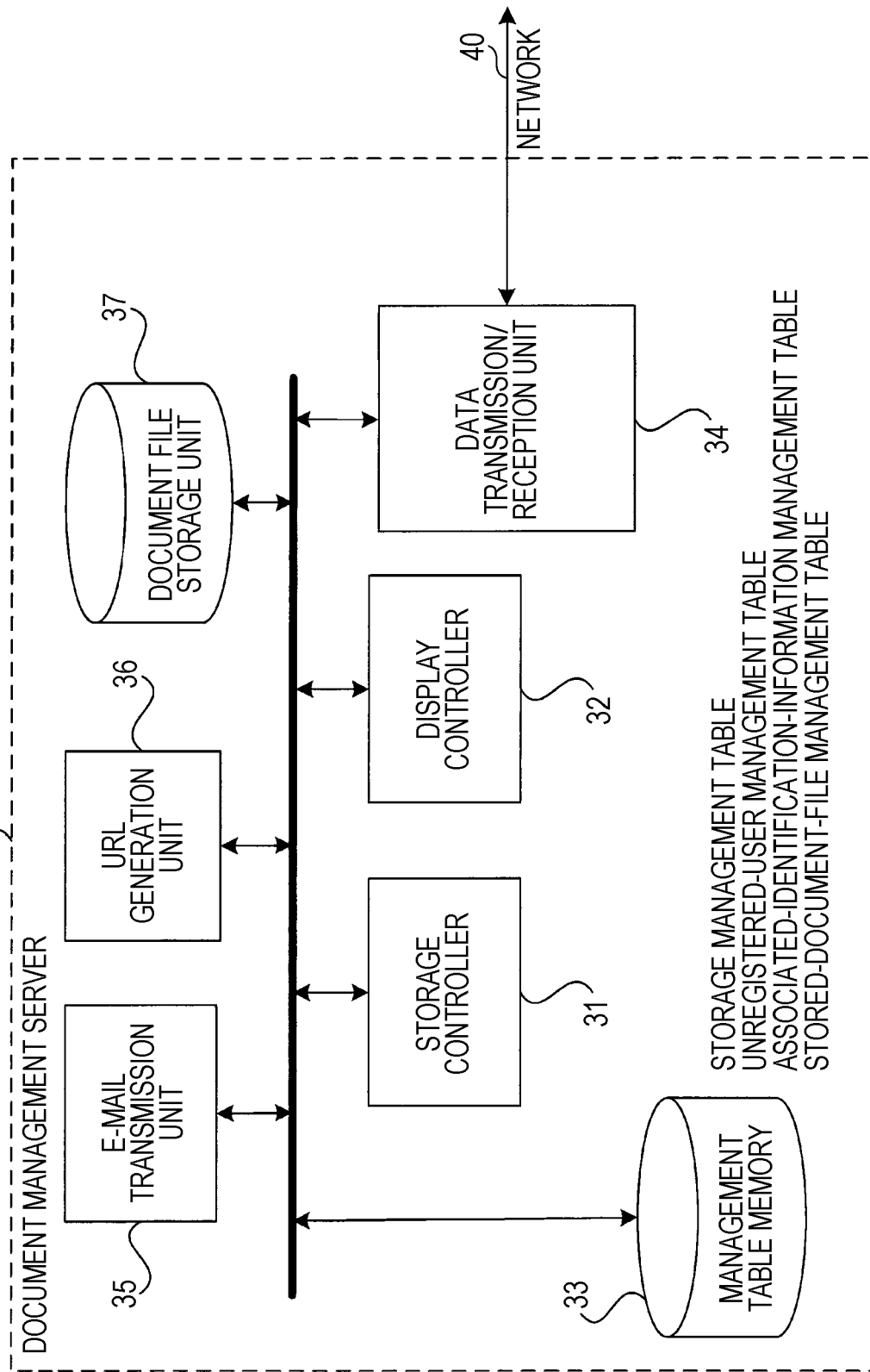
FIG. 3 is a block diagram illustrating the functional configuration of the document management server in the exemplary embodiment of the present disclosure.

FIG. 3 is a block diagram illustrating the functional configuration of the document management server 10 implemented by running the control program.

As illustrated in FIG. 3, the document management server 10 in this exemplary embodiment includes a storage controller 31, a display controller 32, a management table memory 33, a data transmission/reception unit 34, an e-mail transmission unit 35, a URL generation unit 36, and a document file storage unit 37.

The data transmission/reception unit 34 transmits and receives data via the network 40 among the terminal apparatus 20 of the registered user A, the terminal apparatus 21 of the unregistered user B, and the terminal apparatus 22 of the unregistered user C.

Under the control of the storage controller 31, the e-mail transmission unit 35 generates e-mails for a request for uploading document files (hereinafter, also referred to as document-file upload request) and transmits the e-mails to the terminal apparatuses 21 and 22 of the unregistered users B and C via the data transmission/reception unit 34.

The URL generation unit 36 serially generates multiple mutually different URLs under the control of the storage controller 31.

The URL generation unit 36 generates the multiple mutually different URLs in the following manner. For example, the URL generation unit 36 generates mutually different IDs each called a universally unique identifier (UUID) and thereby generates URLs respectively including the UUIDs, or generates random numbers and thereby generates URLs respectively including the random numbers.

The document file storage unit 37 stores various document files accepted from the unregistered users in a storage area set in advance such as a folder.

When accepting the storing of data from an unregistered user yet to be registered in advance, the storage controller 31 performs control to store the accepted document file in the document file storage unit 37 in association with identification information that enables the unregistered user to be discriminated from the other unregistered users.

As the identification information, URL information that varies on a per unregistered-user basis and that is transmitted as a storage place for the document file to the unregistered user may be used.

The URL information is generated by the URL generation unit 36 to vary on the per unregistered-user basis by including randomly generated information in the URL information.

The URL information may also be generated to vary on the per unregistered-user basis by including destination information such as an e-mail address in the URL information, the destination information being used when the URL information is transmitted to the unregistered user.

Further, a cookie issued when the unregistered user performs the access may also be used as the identification information.

A cookie is data information that is issued by a web server when a terminal apparatus accesses the web server and that is to be stored in the terminal apparatus. The web server stores the cookie. When the terminal apparatus accesses the web server second time, the web server verifies whether the cookie stored therein matches the cookie stored in the terminal apparatus and thereby may identify the terminal apparatus.

Further, the terminal ID (terminal identification number) of the terminal apparatus used when the unregistered user performs the access may also be used as the identification information. For example, if the unregistered user accesses the web server from a mobile terminal apparatus that is not a personal computer as illustrated in FIG. 1, terminal ID information that is assigned on a per terminal-apparatus basis and that thus is unique to the terminal apparatus is transmitted to the web server. Accordingly, by using the terminal ID as the identification information, the document management server 10 may identify the terminal apparatus performing the access.

Further, location information regarding the terminal apparatus used when the unregistered user performs the access may also be used as the identification information. Specifically, if the terminal apparatus has a global positioning system (GPS) receiver, the document management server 10 uses the location information as the identification information with the GPS receiver and thereby may identify the terminal apparatus used for the access.

When an unregistered user performs access, the display controller 32 performs control to switch data to be displayed to the unregistered user performing the access, the data being switched by using the identification information as described above.

Specifically, the display controller 32 performs the control to display, to the unregistered user performing the access, only the data stored in association with the identification information regarding the unregistered user.

For example, if the identification information is the URL information, the display controller 32 performs the control to display, to the unregistered user, only the data stored in association with the URL information used when the unregistered user performs the access.

The management table memory 33 stores various management tables to implement the control as described above. Specifically, the management table memory 33 stores a storage management table, an unregistered-user management table, an associated-identification-information management table, and a stored-document-file management table.

FIG. 4 illustrates an example storage management table. As illustrated in FIG. 4, the storage management table stores association between an acceptance identifier and a folder identifier. The acceptance identifier is set to vary on a per document-file-upload-request basis, that is, for each of requests (document-file upload requests) for uploading document files to be stored in the same storage area. For example, one acceptance identifier is set for one request for uploading questionnaire answers (hereinafter, also referred to as a questionnaire-answer upload request) by which the questionnaire answers are to be stored in the same storage area when the questionnaire answers are accepted from unregistered users. The folder identifier is an identifier for designating a storage area such as a folder for storing the accepted document files.

FIG. 5 illustrates an example unregistered-user management table. As illustrated in FIG. 5, the unregistered-user management table stores association among an acceptance identifier, a destination identifier, a destination e-mail address that is destination information, and a URL that is URL information transmitted to an unregistered user to accept a questionnaire answer. The destination e-mail address is destination information for transmitting a questionnaire-answer upload request to the unregistered user. The URL is mutually different URL information generated by the URL generation unit 36 to vary on a per destination-e-mail-address basis, as described above. The destination identifier is set for the URL on a one-to-one basis. In FIG. 5, "address1" is associated with https://example.com/abcdefgh, and "address2" is associated with "https://example.com/ijklmnop".

FIG. 6 illustrates an example associated-identification-information management table. As illustrated in FIG. 6, the identification-information management table stores association among the acceptance identifier, a document file identifier, and the destination identifier. The document file identifier is set on a per document-file basis when a document file of a questionnaire answer is uploaded from an unregistered user to whom a questionnaire-answer upload request is transmitted.

FIG. 7 illustrates an example stored-document-file management table. As illustrated in FIG. 7, the stored-document-file management table stores association between the folder identifier and the document file identifier. The example of stored document files in FIG. 7 illustrates that two document files with the document file identifiers "document1" and "document2" are stored in the storage area with the folder identifier "folder1".

In the associated-identification-information management table in FIG. 6, the destination identifier "address1" is associated with the document file identifier "document1", and the destination identifier "address2" is associated with the document file identifier "document2". With reference to the unregistered-user management table in FIG. 5, the destination identifiers "address1" and "address2" are respectively associated with the URLs "https://example.com/abcdefgh" and "https://example.com/ijklmnop".

The document files accepted from the unregistered users are stored in the same storage area in the document file storage unit 37 in association with the URLs that vary on a per unregistered-user basis.

The operation of the document management server 10 in this exemplary embodiment will be described in detail with reference to the drawings.

Figure 8:
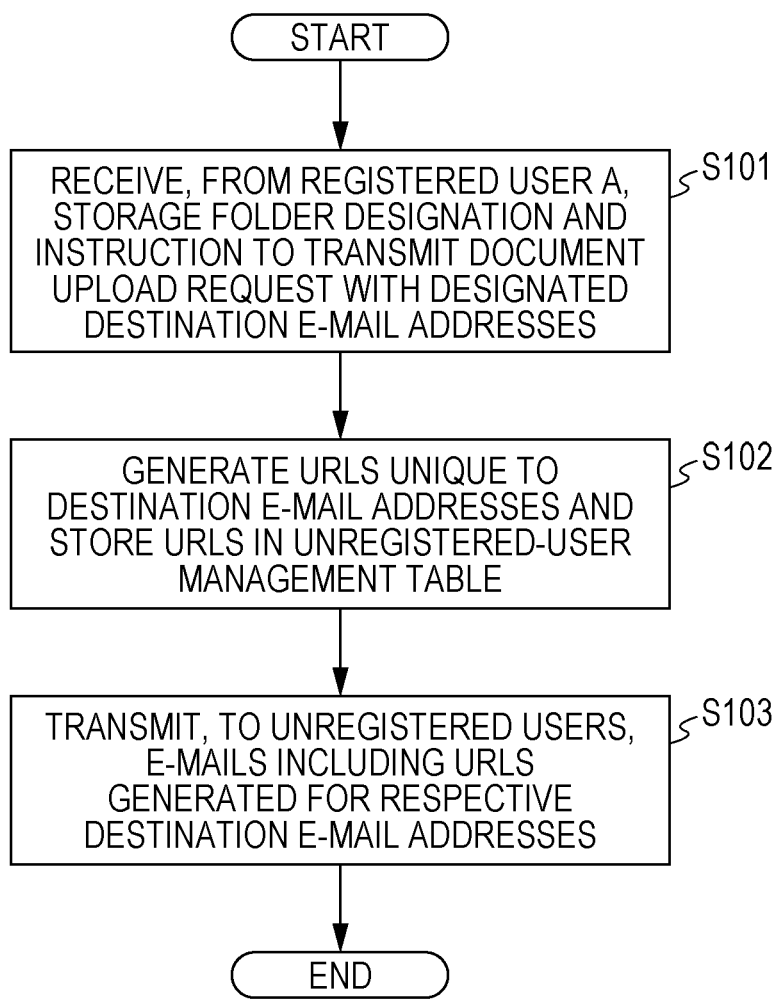
FIG. 8 is a flowchart for explaining operations performed when the document management server transmits a request for uploading a questionnaire answer to unregistered users on the basis of an instruction from a registered user.

First, operations performed when the document management server 10 transmits a questionnaire-answer upload request to the unregistered users B and C in accordance with an instruction from the registered user A will be described with reference to the flowchart in FIG. 8.

The document management server 10 receives, from the terminal apparatus 20 of the registered user A, storage folder (storage area) designation for questionnaire answers and an instruction to transmit a document upload request with the designated destination e-mail addresses of the unregistered users to whom the upload request is to be transmitted (step S101).

The storage controller 31 controls the URL generation unit 36 to generate URLs unique to the destination e-mail addresses and stores the URLs in the unregistered-user management table as illustrated in FIG. 5 (step S102).

The storage controller 31 causes the e-mail transmission unit 35 to transmit, to the unregistered users, e-mails as the questionnaire-answer upload request that respectively include URLs generated for the respective destination e-mail addresses (step S103).

FIG. 9 illustrates an example e-mail transmitted in this manner. The example e-mail illustrated in FIG. 9 illustrates an example of an e-mail transmitted to the unregistered user B as a questionnaire-answer upload request. The e-mail includes the URL https://example.com/abcdefgh associated with the destination e-mail address "taro@example.com" of the unregistered user B.

Figure 10:
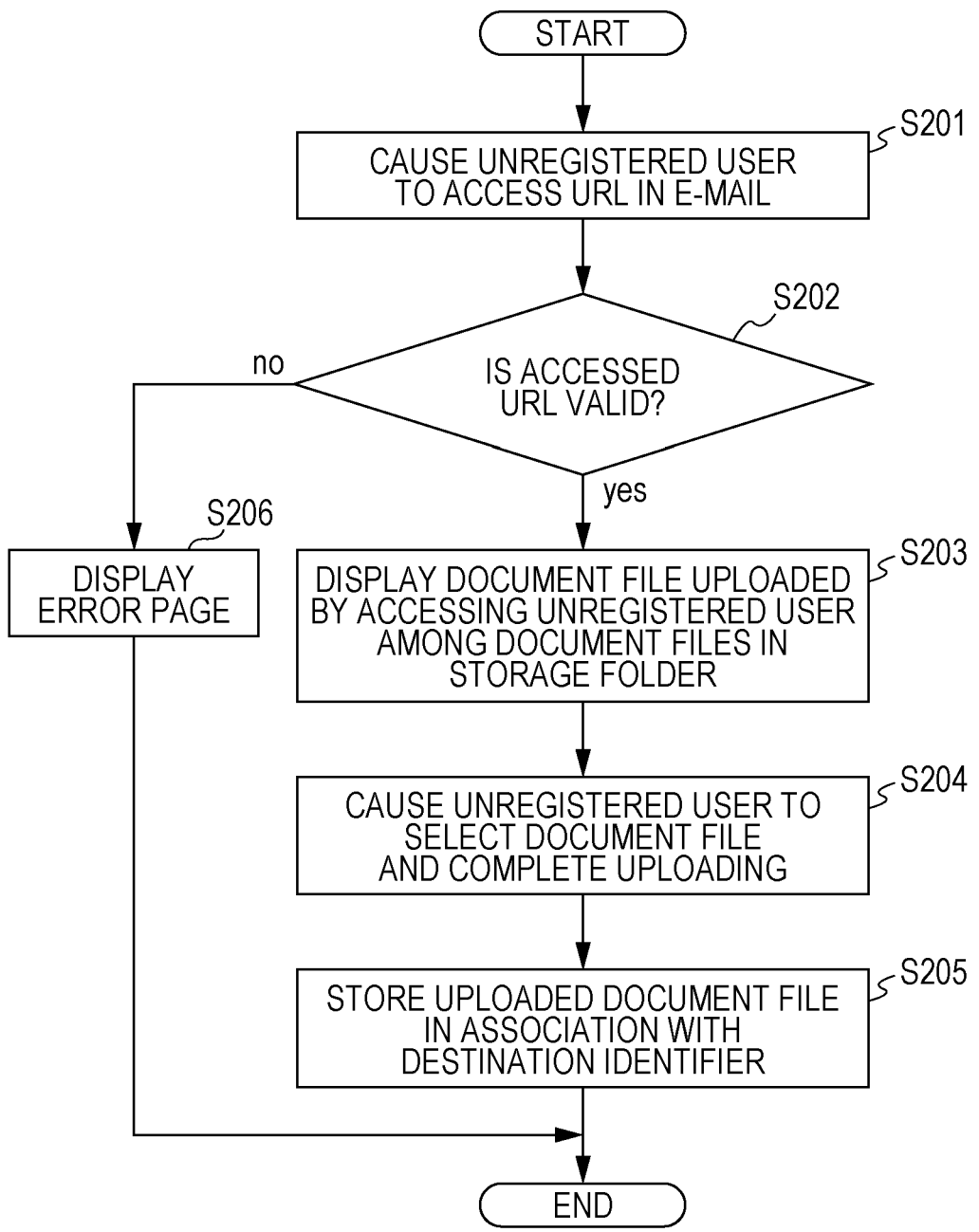
FIG. 10 is a flowchart for explaining operations performed when each unregistered user having received the e-mail as the request for uploading a questionnaire answer as illustrated in FIG. 9 performs steps for uploading the questionnaire answer.

Operations performed when an unregistered user having received the e-mail as the questionnaire-answer upload request as illustrated in FIG. 9 performs steps for uploading a questionnaire answer will be described with reference to the flowchart in FIG. 10.

The unregistered user accesses the URL included in the e-mail transmitted as the questionnaire-answer upload request (step S201).

In the document management server 10, the storage controller 31 determines whether the URL used when the unregistered user performs the access is valid (step S202). The reason why the validity of the URL is determined is that if an expiration date is set for the URL, whether the used URL expires is to be determined.

If the URL used when the unregistered user performs the access is invalid (no in step S202), the display controller 32 displays an error page on the terminal apparatus of the unregistered user (step S206).

If the URL used when the unregistered user performs the access is valid (yes in step S202), the display controller 32 displays one or more document files having uploaded by the unregistered user performing the access and stored in the storage folder, if any, among document files stored in the storage folder (step S203).

For example, if the URL used when the unregistered user B performs the access is "https://example.com/abcdefgh", the display controller 32 determines that the destination identifier associated with this URL is "address1" from the unregistered-user management table illustrated in FIG. 5. If the document file associated with the destination identifier "address1" is stored in the storage area, the display controller 32 displays the document file on the terminal apparatus 21 of the unregistered user B.

The unregistered user selects a document file to be transmitted to the document management server 10 and completes uploading (step S204).

The storage controller 31 stores the document file uploaded by the unregistered user in the storage area designated by the document file storage unit 37 in association with the destination identifier (step S205).

Figure 11:
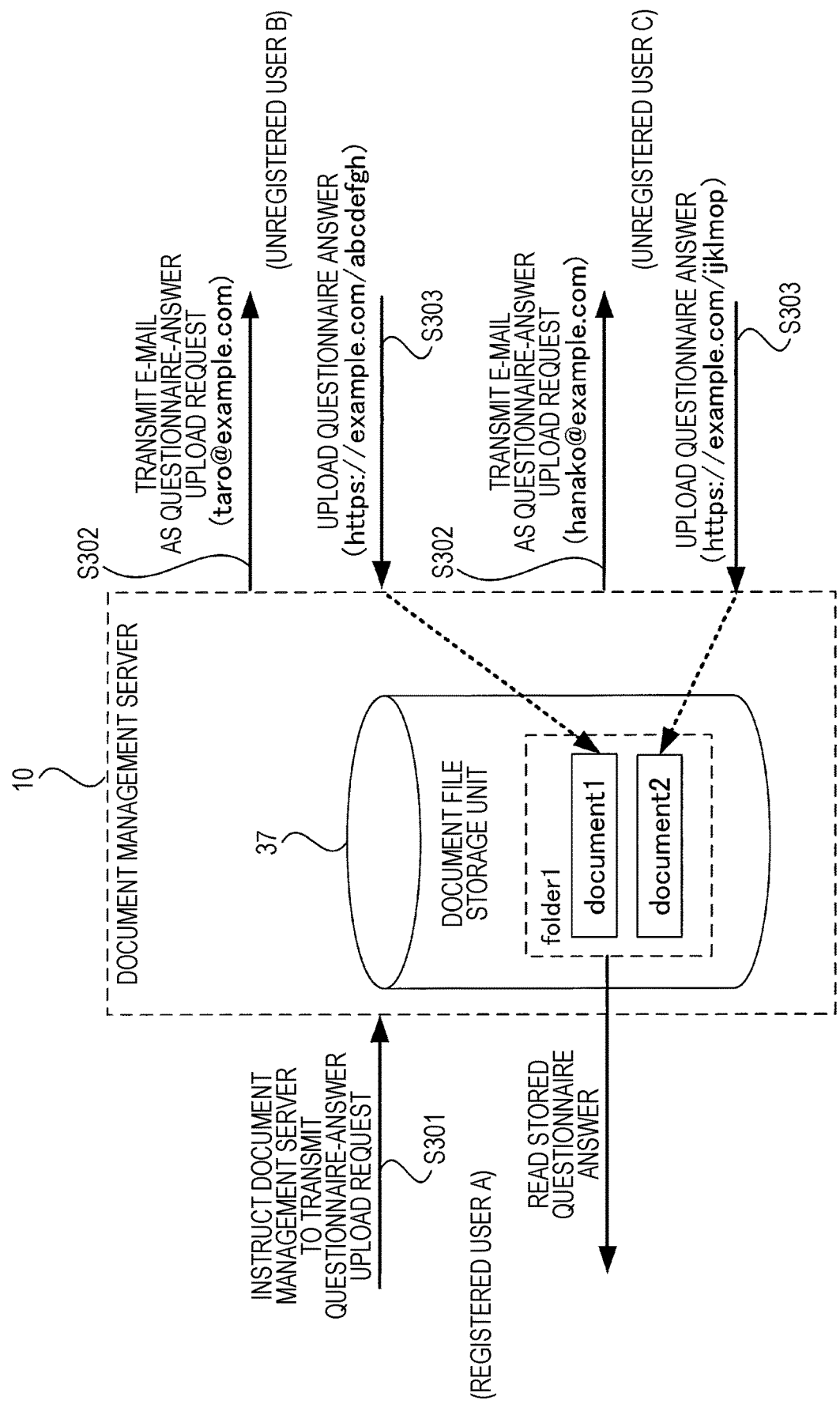
FIG. 11 is a diagram for specifically explaining the process flow described with reference to the flowchart in FIG. 10.

The processing flow described with reference to the flowchart in FIG. 10 will be specifically described with reference to FIG. 11.

The registered user A transmits, to the document management server 10, an instruction to transmit a questionnaire-answer upload request, designating the e-mail addresses or the like of unregistered users (step S301). The document management server 10 transmits, to the terminal apparatuses 21 and 22 of the unregistered users B and C, e-mails as the questionnaire-answer upload request (step S302).

The unregistered users B and C receiving the e-mails access the document management server 10 by using the respective URLs included in the e-mails and then upload the questionnaire answers (step S303).

The document file as the questionnaire answer uploaded by the unregistered user B is assigned the document file identifier "document1" and stored in the storage area with the folder identifier "folder1".

The document file as the questionnaire answer uploaded by the unregistered user C is assigned the document file identifier "document2" and stored in the storage area with the folder identifier "folder1".

As illustrated in the associated-identification-information management table in FIG. 6, the destination identifier "address1" is associated with the document file identifier "document1", and the destination identifier "address2" is associated with the document file identifier "document2".

When the registered user A accesses the document management server 10, an authentication process is executed. Accordingly, the registered user A is allowed to read both of the questionnaire answer of the unregistered user B and the questionnaire answer of the unregistered user C that are stored in the storage area with the folder identifier "folder1" in the document file storage unit 37.

Assume a case where after the questionnaire answers are uploaded, the unregistered users B and C again access the document management server 10. Even in this case, only the document file uploaded by the unregistered user B associated with the URL "https://example.com/abcdefgh" is displayed to the unregistered user B. Likewise, only the document file uploaded by the unregistered user C associated with the URL "https://example.com/ijklmop" is displayed to the unregistered user C.

Figure 12B:
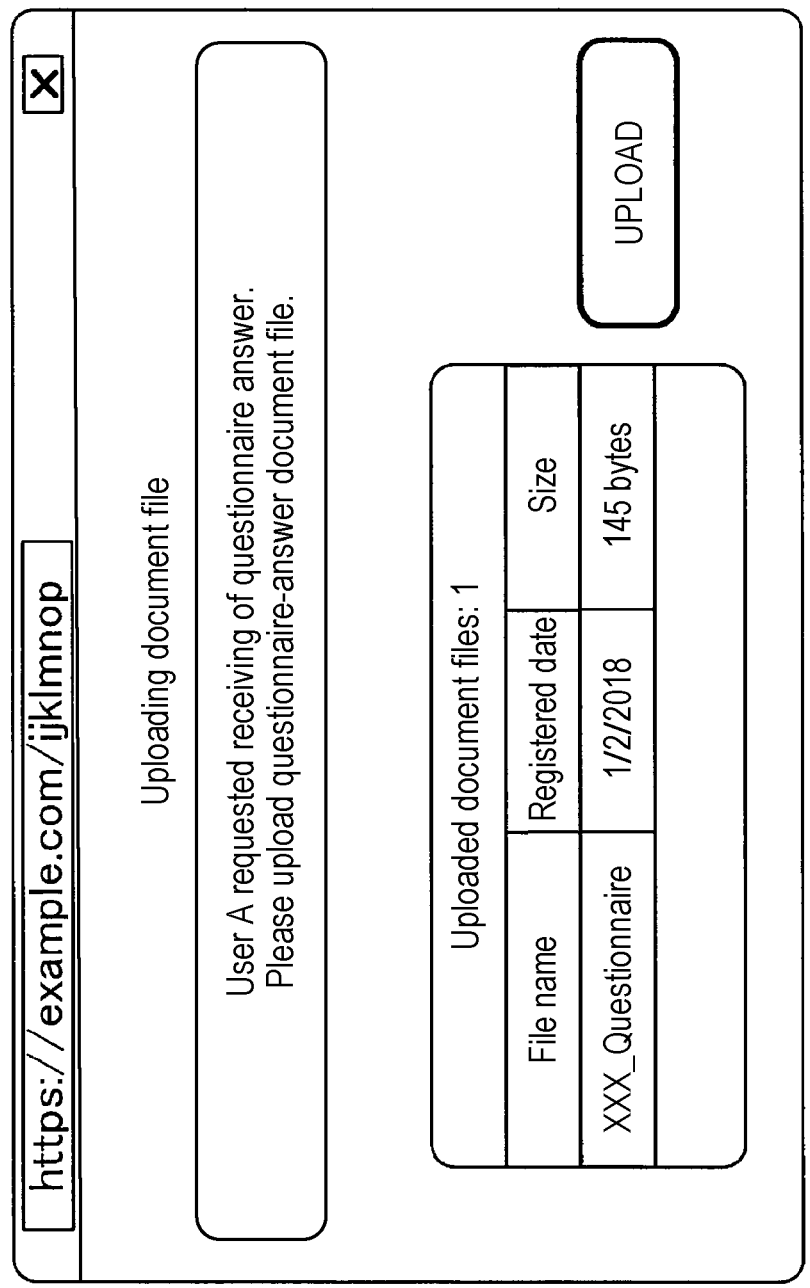
Figure 12C:
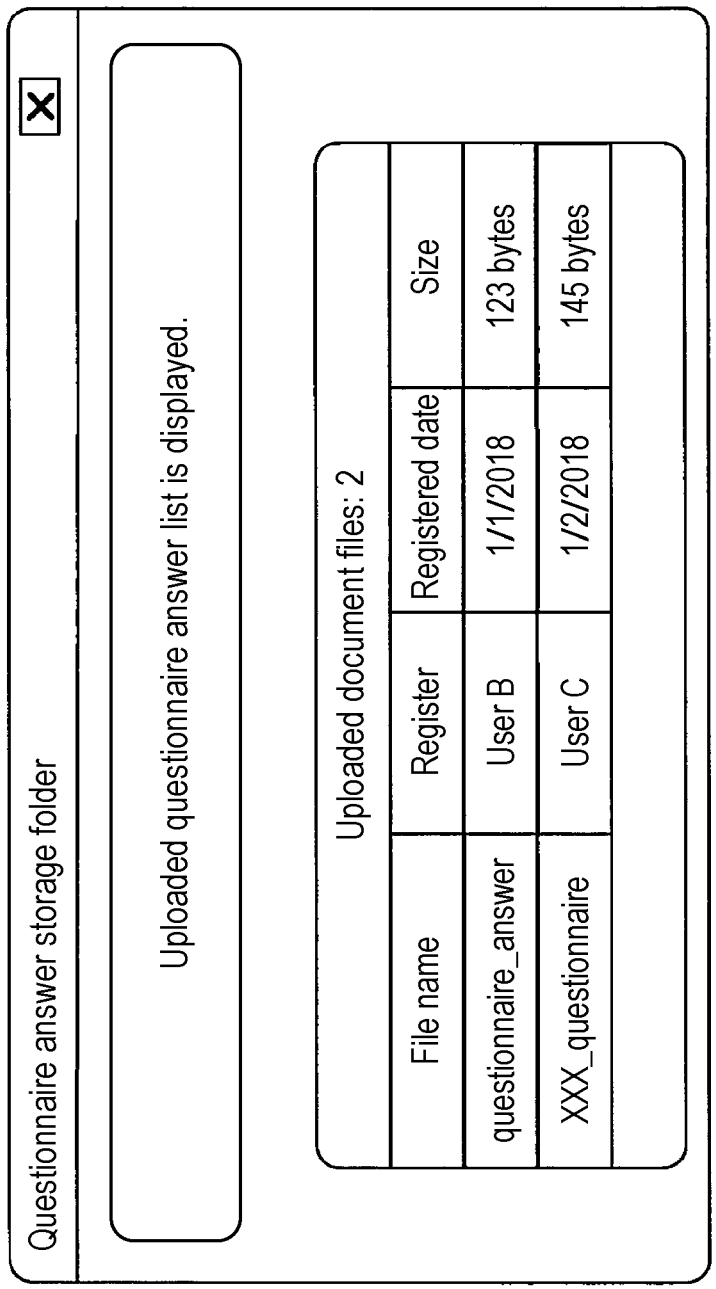
FIG. 12C is a view illustrating an example viewing screen of the terminal apparatus of the registered user.

FIGS. 12A and 12B respectively illustrate example upload screens displayed on the terminal apparatuses 21 and 22 of the unregistered users B and C, and FIG. 12C illustrates an example viewing screen on the terminal apparatus 20 of the registered user A, as the result of the control as described above.

FIGS. 12A, 12B, and 12C illustrate the example screens displayed after the unregistered users B and C respectively upload the document files "questionnaire_answer" and "XXX_questionnaire" to the document management server 10.

With reference to FIG. 12A, only the document file with the file name "questionnaire_answer" having been uploaded by the unregistered user B is displayed on the example upload screen of the terminal apparatus 21 of the unregistered user B.

With reference to FIG. 12B, only the document file with the file name "XXX_questionnaire" having been uploaded by the unregistered user C is displayed on the example upload screen of the terminal apparatus 22 of the unregistered user C.

With reference to FIG. 12C, both the two document files "questionnaire_answer" and "XXX_questionnaire" uploaded by the unregistered users B and C are displayed on the example viewing screen of the terminal apparatus 20 of the registered user A.

As described above, the document file "XXX_questionnaire" uploaded by the unregistered user C is not displayed on the display screen of the unregistered user B, and the document file "questionnaire_answer" uploaded by the unregistered user B is not displayed on the display screen of the unregistered user C.

Changing File Name of Uploaded Document File

A case of changing the file names of document files uploaded from the unregistered users to the document management server 10 will be described. In the exemplary embodiment described above, the document files uploaded by the unregistered users are stored without changing the file names in the folder (storage area) set in advance in the document file storage unit 37.

However, if the unregistered users respectively upload the document files with various respective file names, it is likely that some document files have the same file name. In such a case, when an unregistered user uploads a document file after a different unregistered user uploads a document file, and if an error is notified to indicate that the document file with the same file name has been stored, the unregistered user may surmise the uploaded state of the document file of the different unregistered user.

The storage controller 31 thus performs control to change the file name of each document file accepted from the corresponding unregistered user and to store the document file in the document file storage unit 37.

For example, the storage controller 31 changes the file name of each document file accepted from the corresponding unregistered user, by adding, to the file name of the document file accepted from the unregistered user, information based on destination information such as an e-mail address for transmitting URL information to the unregistered user.

Specifically, if the file name before the change is "questionnaire_answer", the destination address is added to the file name, and thereby the file name is changed to "taro@example.com_questionnair_answer". Alternatively, instead of simply adding the destination address, the file name may be changed by adding, to the file name, a character string made shorter by calculating a hash value with a hash function.

The storage controller 31 may also change the file name of the document file accepted from the unregistered user, by adding, to the file name of the document file accepted from the unregistered user, information varying on a per destination basis. The unregistered user have been assigned the destination of a document-file storing request transmitted to the unregistered user.

For example, the file names are changed by being prefixed or suffixed with serial numbers such as "01", "02", and "03" respectively assigned to destinations for the questionnaire-answer upload request.

Specifically, if the file name before the change is "questionnaire_answer", the file name is suffixed with the character string "01" and is thus changed to "questionnaire_answer_01".

Changing the file names by adding such information enables different file names to be respectively provided on a per unregistered-user basis even if unregistered users use the same e-mail address. In addition, a character string to be added to the file name is made shorter easily. However, to issue the serial numbers, the numbers assigned to the respective destinations need to be managed by using a management table.

The storage controller 31 may change the file name of each document file accepted from the corresponding unregistered user, by adding, to the file name of the document file accepted from the unregistered user, information vary on a per destination basis and every time the storing of the document file is accepted. The unregistered user have been assigned the destination of the document-file storing request transmitted to the unregistered user.

When the information varying not only on a per questionnaire-answer-upload-request-destination basis but also every time data storing is accepted as described above, the document file may be provided with a different file name even if an unregistered user uploads the document file multiple times with the same file name.

For example, in a case where the number "01" is issued for an unregistered user and the number "01" is issued in the first uploading, and in a case where the file name before the change is "questionnaire_answer", the file name is prefixed and suffixed with character strings "01" and "01", respectively, and is changed to "01_questionnaire_answer_01".

When the unregistered user uploads the document file with the file name "questionnaire_answer" again, the file name is this time prefixed and suffixed with the character strings "02" and "01", respectively, and is thereby changed to "02_questionnaire_answer_01".

Note that instead of adding the two numbers to the file name, computing set in advance may be performed on the two numbers, and the computing result may be added to the file name.

When the unregistered user or the registered user performs the access and when the display controller 32 displays a document file to a corresponding one of the unregistered user and the registered user, the display controller 32 displays the file name before the change to the unregistered user and displays the file name after the change to the registered user.

Note that instead of changing the file name of a document file every time the unregistered user uploads the document file, the storage controller 31 may change the file name only when the file name of the uploaded document file is identical to the file name of the stored document file.

Figure 13A:
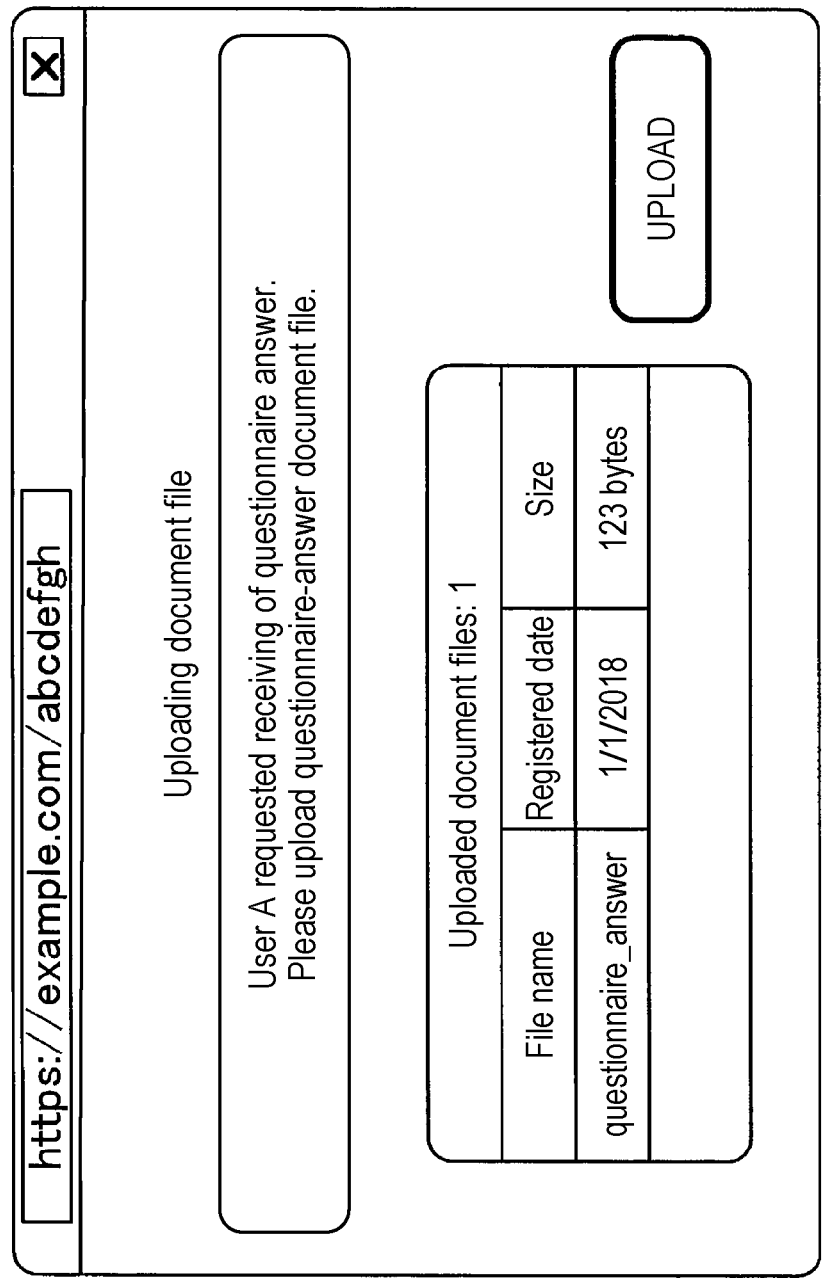
FIGS. 13A and 13B are views respectively illustrating example upload screens displayed on the terminal apparatuses of the respective unregistered users.
Figure 13B:
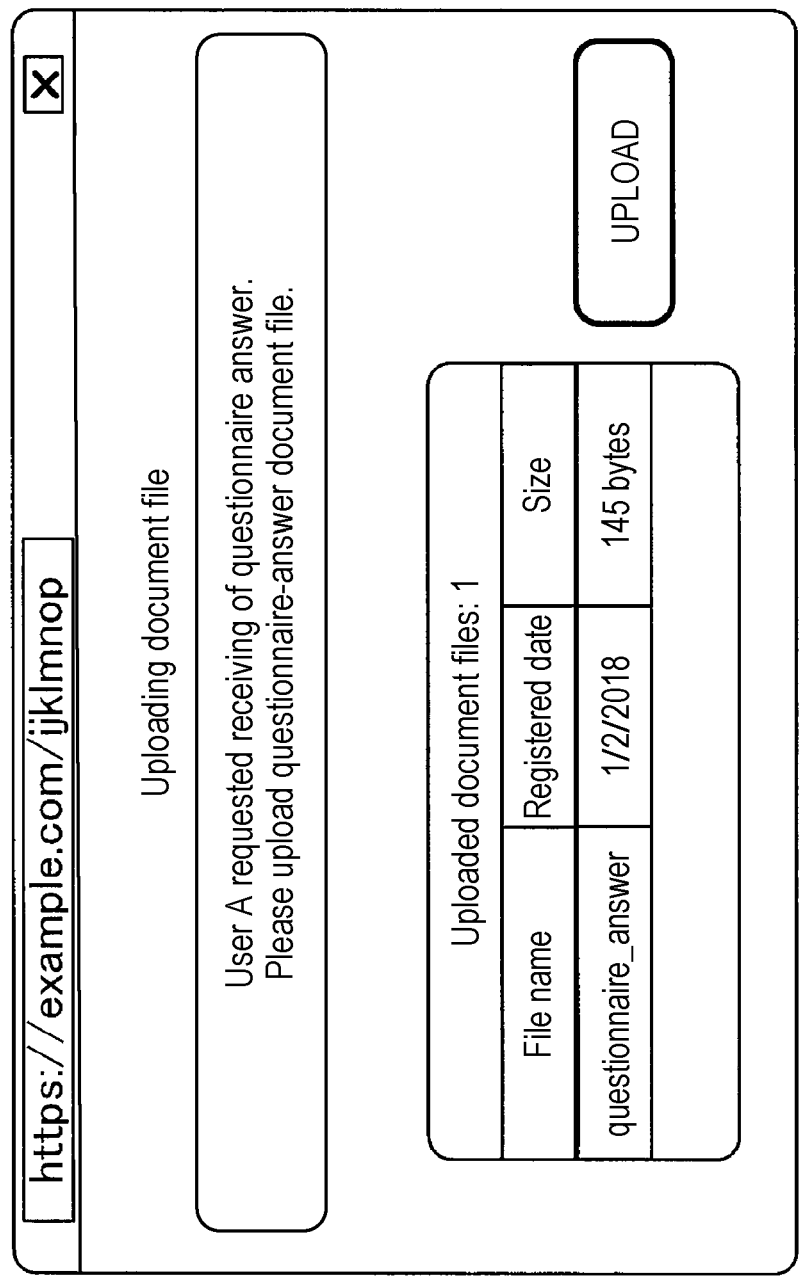
Figure 13C:
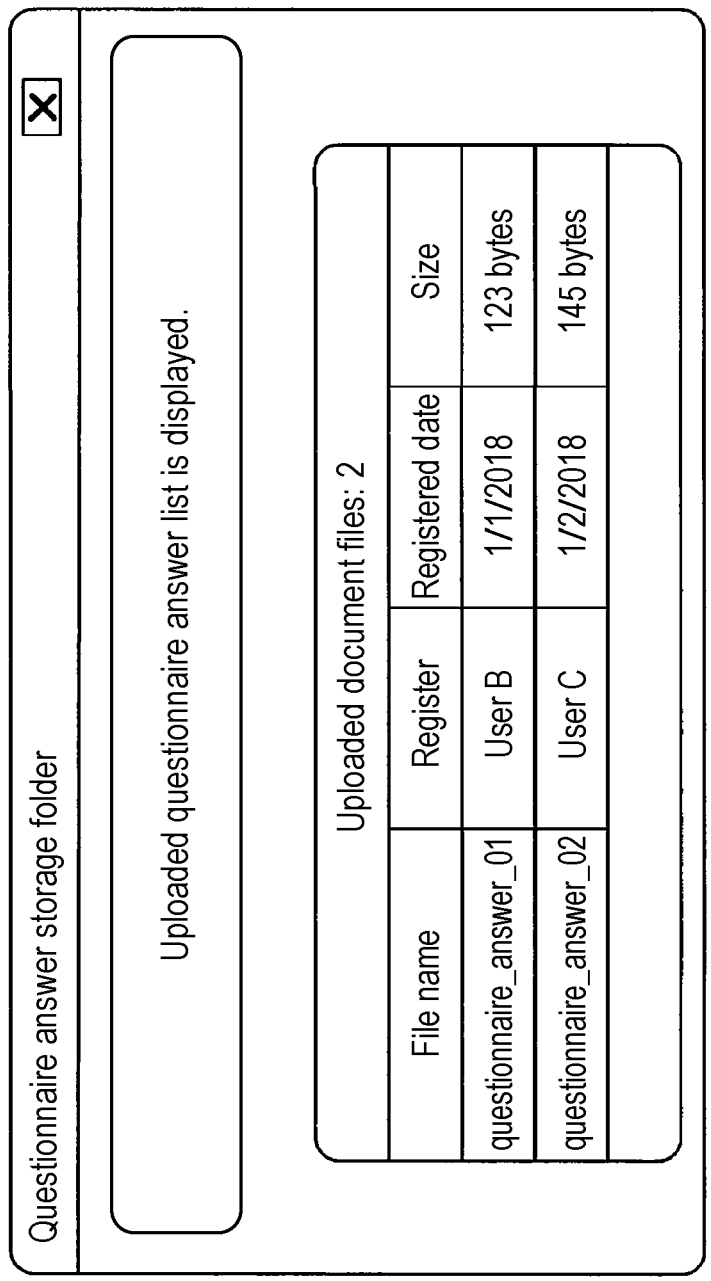
FIG. 13C is a view illustrating an example viewing screen of the terminal apparatus of the registered user.

FIGS. 13A and 13B respectively illustrate example upload screens displayed on the terminal apparatuses 21 and 22 of the unregistered users B and C, and FIG. 13C illustrates an example viewing screen displayed on the terminal apparatus 20 of the registered user A, as the result of the control as described above.

Note that FIGS. 13A, 13B, and 13C illustrate the example display screens after the unregistered users B and C upload the document files with the same file name "questionnaire_answer" to the document management server 10.

The description is provided on the assumption that the document files with the same file name "questionnaire_answer" uploaded by the unregistered users B and C are respectively to be provided with the changed file names "questionnaire_answer_01" and "questionnaire_answer_02" and thereafter be stored.

With reference to FIG. 13A, only the document file with the file name "questionnaire_answer" having been uploaded by the unregistered user B is displayed on the example upload screen of the terminal apparatus 21 of the unregistered user B.

With reference to FIG. 13B, only the document file with the file name "questionnaire_answer" having been uploaded by the unregistered user C is displayed on the example upload screen of the terminal apparatus 22 of the unregistered user C.

With reference to FIG. 13C, both the two document files "questionnaire_answer_01" and "questionnaire_answer_02" respectively uploaded by the unregistered users B and C are displayed on the example viewing screen of the terminal apparatus 20 of the registered user A.

Note that if each file name after the change is displayed to the corresponding unregistered user, there is a possibility in which they do not recognize the relationship with one or more document files having uploaded by them. Accordingly, the file name before the change is displayed to the unregistered user, and thereby the unregistered user recognizes a consistent relationship with the one or more document files having uploaded by them.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
    a storage controller that performs control when storing of data is accepted from an unregistered user yet to be registered in advance, the control being performed to store the accepted data in association with identification information that enables the unregistered user to be identified to be different from a different unregistered user; and
    a display controller that performs control when the unregistered user performs access to the information processing apparatus, the control being performed to change data to be displayed to the unregistered user performing the access, the data being changed from first data to second data, the second data being only data stored in association with the identification information regarding the unregistered user, the first data being displayed only to a registered user,
    wherein when the registered user and the unregistered user attempt to gain access to the information processing apparatus and when the display controller displays a document file to a corresponding one of the unregistered user and the registered user, the display controller displays a file name before the change to the unregistered user and displays a file name after the change to the registered user.

2. The information processing apparatus according to claim 1,
    wherein the identification information is URL information that varies on a per unregistered-user basis and that is transmitted as a place for storing the data to the unregistered user.

3. The information processing apparatus according to claim 2,
    wherein the URL information is generated to vary on the per unregistered-user basis by including randomly generated information in the URL information.

4. The information processing apparatus according to claim 2,
    wherein the URL information is generated to vary on the per unregistered-user basis by including destination information in the URL information, the destination information being used when the URL information is transmitted to the unregistered user.

5. The information processing apparatus according to claim 1,
    wherein the identification information is a cookie issued when the unregistered user performs the access.

6. The information processing apparatus according to claim 1,
    wherein the identification information is a terminal identification number of a terminal used when the unregistered user performs the access.

7. The information processing apparatus according to claim 1,
    wherein the identification information is location information regarding a terminal used when the unregistered user performs the access.

8. The information processing apparatus according to claim 1,
    wherein the storage controller performs control to change a name of the data accepted from the unregistered user and to store the data.

9. The information processing apparatus according to claim 8,
    wherein the storage controller changes the name of the data accepted from the unregistered user, the name of the data being changed by adding, to the name of the data accepted from the unregistered user, information based on destination information used when URL information is transmitted to the unregistered user, the URL information being the identification information and varying on a per unregistered-user basis.

10. The information processing apparatus according to claim 8,
    wherein the storage controller changes the name of the data accepted from the unregistered user, the name of the data being changed by adding, to the name of the data accepted from the unregistered user, information varying on a per destination basis, the unregistered user having been assigned a destination of a data storing request transmitted to the unregistered user.

11. The information processing apparatus according to claim 8,
    wherein the storage controller changes the name of the data accepted from the unregistered user, the name of the data being changed by adding, to the name of the data accepted from the unregistered user, information varying on a per destination basis and every time data storing is accepted, the unregistered user having been assigned a destination of a data storing request transmitted to the unregistered user.

12. The information processing apparatus according to claim 8,
    wherein when the unregistered user, the different unregistered user, or a registered user performs the access, and when the display controller displays data to a corresponding one of the unregistered user, the different unregistered user, and the registered user, the display controller displays the name yet to be changed to the unregistered user or the different unregistered user, and the display controller displays a changed name to the registered user.

13. A non-transitory computer readable medium storing a program causing a computer to execute a process, the process comprising:
    performing control when storing of data is accepted from an unregistered user yet to be registered in advance, the control being performed to store the accepted data in association with identification information that enables the unregistered user to be identified to be different from a different unregistered user; and performing control when the unregistered user performs access to the information processing apparatus, the control being performed to change data to be displayed to the unregistered user performing the access, the data being changed from first data to second data, the second data being only data stored in association with the identification information regarding the unregistered user the first data being displayed only to a registered user, wherein when the registered user and the unregistered user attempt to gain access to the information processing apparatus and when the display controller displays a document file to a corresponding one of the unregistered user and the registered user, the process performs control to display a file name before the change to the unregistered user and display a file name after the change to the registered user.

14. An information processing apparatus comprising:

means for performing control when storing of data is accepted from an unregistered user yet to be registered in advance, the control being performed to store the accepted data in association with identification information that enables the unregistered user to be identified to be different from a different unregistered user; and means for performing control when the unregistered user performs access to the information processing apparatus, the control being performed to change data to be displayed to the unregistered user performing the access, the data being changed from first data to second data, the second data being only data stored in association with the identification information regarding the unregistered user the first data being displayed only to a registered user, wherein when the registered user and the unregistered user attempt to gain access to the information processing apparatus and when the means for performing control when the unregistered user performs access to the information processing apparatus displays a document file to a corresponding one of the unregistered user and the registered user, displays a file name before the change to the unregistered user and displays a file name after the change to the registered user.

* * * * *